United States Patent [19]

Gillemot

[11] 4,015,072
[45] Mar. 29, 1977

[54] RE-ENTERABLE CABLE SPLICE ENCLOSURE AND KIT INCLUDING RE-CLOSABLE TUBULAR HOUSING AND END CAPS

[75] Inventor: George W. Gillemot, Santa Monica, Calif.

[73] Assignee: John T. Thompson, Los Angeles, Calif. ; a part interest

[22] Filed: Sept. 18, 1975

[21] Appl. No.: 614,375

[52] U.S. Cl. .................................. 174/92; 138/156; 138/166; 138/168; 174/93

[51] Int. Cl.² ....................................... H02G 15/18

[58] Field of Search ............ 174/21 R, 71 R, 74 A, 174/76, 77 R, 91, 92, 93, 138 F, DIG. 11; 339/208, 209, 213 R; 138/128, 151, 156, 158, 166, 168; 220/80

[56] References Cited

UNITED STATES PATENTS

| | | | |
|---|---|---|---|
| 3,040,121 | 6/1962 | Gillemot | 174/93 |
| 3,153,693 | 10/1964 | Baxter et al. | 174/93 X |
| 3,260,794 | 7/1966 | Kohler | 174/93 X |
| 3,467,761 | 9/1969 | Plummer | 174/DIG. 11 UX |
| 3,781,461 | 12/1973 | Thompson et al. | 174/93 |
| 3,806,630 | 4/1974 | Thompson et al. | 174/93 X |
| 3,827,704 | 8/1974 | Gillemot et al. | 174/93 X |
| 3,875,325 | 4/1975 | Anderson et al. | 174/92 |
| 3,912,855 | 10/1975 | Thompson et al. | 174/93 |

Primary Examiner—Laramie E. Askin
Attorney, Agent, or Firm—Harris, Kern, Wallen & Tinsley

[57] ABSTRACT

An enclosure and enclosure kit for encapsulating a splice or splices between main and service cables, the enclosure containing a potted compound which prevents the entry of moisture into the splice or splices. The enclosure is re-enterable to permit the addition or deletion of service cables, the potting compound being of a type which is readily removable to permit adding or deleting service connections. More particularly, the enclosure kit includes a re-closable, longitudinally split tubular housing and re-closable, longitudinally split end caps telescopable over the ends of the tubular housing, together with a supply of potting compound adequate to completely charge the enclosure, or to replace potting compound removed upon re-entry. Readily releasable locking elements are provided to close the longitudinal splits in the tubular housing and in the end caps, such locking elements also resisting circumferential expansion of the enclosure components mentioned. The end caps have outer end walls provided with longitudinally slit nipples for main cables, and sealed nipples for service cables, the ends of the sealed nipples being severable to permit insertion of service cables as required.

7 Claims, 4 Drawing Figures

U.S. Patent  Mar. 29, 1977  4,015,072
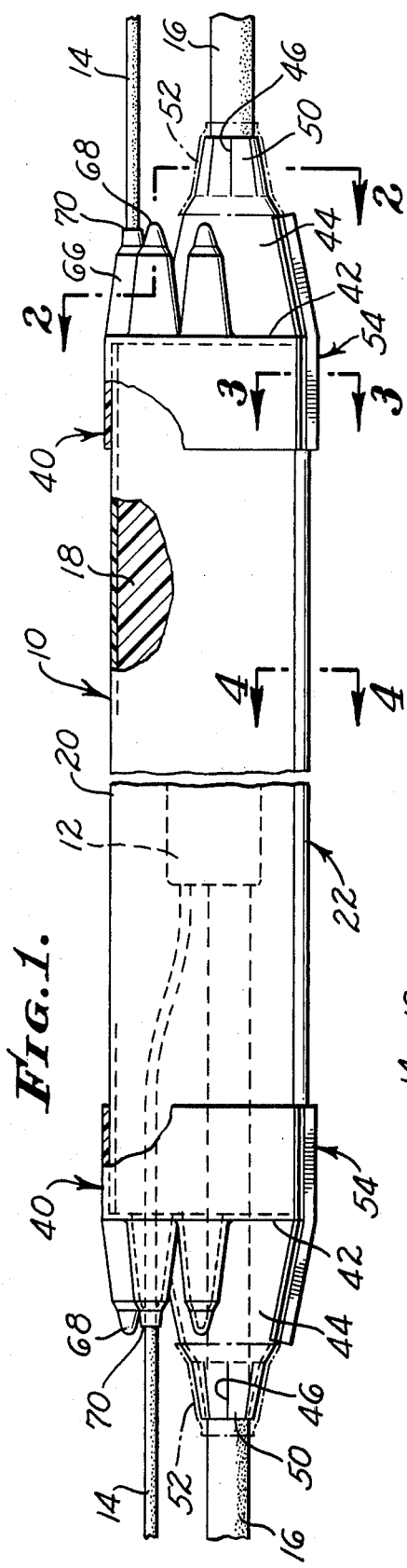
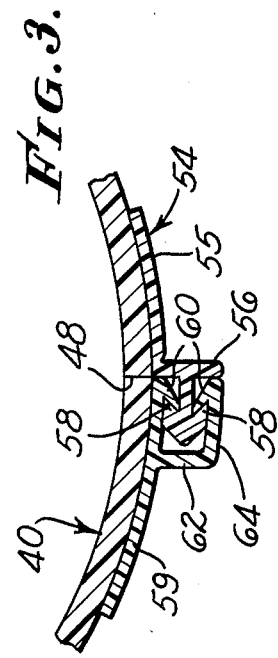
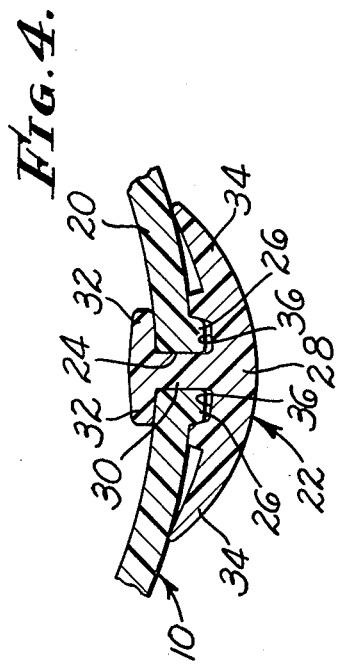
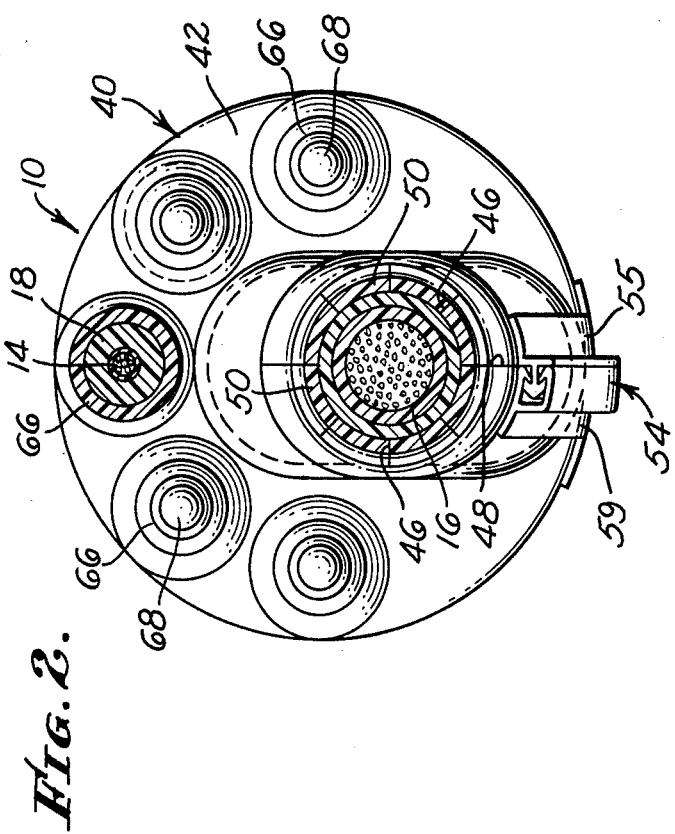

RE-ENTERABLE CABLE SPLICE ENCLOSURE AND KIT INCLUDING RE-CLOSABLE TUBULAR HOUSING AND END CAPS

BACKGROUND OF INVENTION

The present invention relates in general to an enclosure and enclosure kit for encapsulating a splice or splices between main and service cables, such as telephone cables, the splice or splices being potted to prevent the entry of moisture.

More particularly, the present invention relates to a re-enterable cable splice enclosure and kit which permit the addition or deletion of service connections as required by increases and decreases in the number of subscribers. The potting compound is of a type which is readily removable for access to add or delete service connections.

Prior re-enterable cable splice enclosures known to me are either cumbersome, heavy units incorporating large numbers of parts, or they require discarding at least some of the components of the enclosure and the replacement thereof with new, substitute components, or both.

OBJECTS AND SUMMARY OF INVENTION

With the foregoing background in mind, the primary object of the present invention is to provide a re-enterable cable splice enclosure kit which is effective for its purpose, but which is of simple construction, requiring but a few components which are re-usable, except for the potting compound.

More particularly, an important object of the invention is to provide a re-enterable cable splice enclosure kit which comprises simply a re-closable, longitudinally split tubular housing and re-closable, longitudinally split end caps telescopable over the ends of the tubular housings, together with releasable housing locking means for releasably locking the tubular housing against circumferential expansion intermediate the ends thereof and for closing the longitudinal split in the housing intermediate the ends thereof, two releasable end cap locking means for respectively releasably locking the end caps against circumferential expansion and for closing the longitudinal splits therein, and a charge of potting compound appropriate for initial potting, or re-potting after re-entry.

The invention may be summarized as comprising, and another important object is to provide an enclosure kit which comprises: a longitudinally split tubular housing; releasable housing locking means for releasably locking the tubular housing against circumferential expansion intermediate the ends thereof and for closing the longitudinal split in the housing intermediate the ends thereof; flexible, longitudinally split end caps respectively telescopable over the ends of the tubular housing; two releasable end cap locking means for respectively releasably locking the end caps against circumferential expansion and for closing the longitudinal splits therein; each of the end caps including an outer end provided with a longitudinally extending nipple having circumferentially spaced slits which extend longitudinally inwardly from the outer end thereof and one of which constitutes an extension of the split in the corresponding end cap; and the outer end of each of the end caps being provided with longitudinally extending nipples each having a closed outer end adapted to be severed to open same.

Another object of the invention is to provide a construction wherein the longitudinal split in the housing has edges respectively provided with outwardly projecting, longitudinally extending ribs, and wherein the housing locking means comprises a locking strip having a web insertable between the edges of the longitudinal split in the housing, inner flanges respectively engageable with the inner surface of the housing on opposite sides of the longitudinal split therein, and outer flanges respectively engageable with the outer surface of the housing on opposite sides of the longitudinal split therein and respectively having longitudinally extending channels receiving the ribs.

Still another object is to provide an enclosure kit wherein each of the releasable end cap locking means includes a first pair of radially spaced, longitudinally extending hooks carried by one edge of the longitudinal split in the corresponding end cap, and a second pair of radially spaced, longitudinally extending hooks carried by the other edge of the split in the corresponding end cap, the hooks of the first pair being complementary to and interengageable with the hooks of the second pair, and the hooks of the first pair being circumferentially insertable between the hooks of the second pair to interengage same.

While various potting compounds which are readily removable may be utilized as a part of the enclosure kit of the invention, I prefer to employ the readily frangible compound disclosed in my patent application Ser. No. 445,422, filed Feb. 25, 1974, now abandoned. The potting compound of the foregoing patent application, when set, can be crumbled readily by the operator's fingers to remove as much thereof as is necessary for access in adding or deleting service connections. The portion which is thus removed is replaced by a fresh charge of unset potting compound prior to re-closing the enclosure around the splice or splices.

The foregoing objects, advantages, features and results of the present invention, together with various other objects, advantages, features and results thereof which will be evident to those skilled in the cable splice enclosure art in the light of this disclosure, may be achieved with the exemplary embodiment of the invention illustrated in the accompanying drawing and described in detail hereinafter.

DESCRIPTION OF DRAWING

FIG. 1 is a view, partially in side elevation and partially in section, showing a re-enterable cable splice enclosure which embodies the invention;

FIG. 2 is an enlarged view, partially in end elevation and partially in transverse section, taken as indicated by the arrowed line 2—2 of FIG. 1;

FIG. 3 is an enlarged, fragmentary transverse sectional view taken as indicated by the arrowed line 3—3 of FIG. 1 and illustrating a releasable and re-closable end cap locking means of the invention; and FIG. 4 is an enlarged, fragmentary transverse sectional view taken as indicated by the arrowed line 4—4 of FIG. 1 and illustrating a releasable, re-closable housing locking means embodied in the enclosure and enclosure kit of the invention.

DESCRIPTION OF EXEMPLARY EMBODIMENT OF INVENTION

Referring initially to FIG. 1 of the drawing, the re-enterable cable splice enclosure of the invention is designated generally therein by the numeral 10 and houses a splice or splices, designated diagrammatically at 12, between service cables 14 and a main cable 16 extending longitudinally through the enclosure. The splice or splices 12 are encapsulated in a suitable, readily removable potting compound 18, which may be of the nature hereinbefore discussed, and which preferably at least substantially fills the enclosure 10.

The enclosure 10 includes a re-closable, longitudinally split tubular housing 20 formed of a suitable plastic material, preferably one which is relatively rigid. A housing locking means 22 releasably locks the tubular housing 20 against circumferential expansion intermediate the ends thereof and closes the longitudinal split 24 in the housing intermediate the ends thereof.

As best shown in FIG. 4 of the drawing, the edges of the longitudinal split 24 in the tubular housing 20 are respectively provided with outwardly projecting, longitudinally extending ribs 26. The housing locking means 22 comprises a locking strip 28 having a web 30 insertable between the edges of the longitudinal split 24 in the housing 20. The locking strip 28 has inner flanges 32 respectively engageable with the inner surface of the housing 20 on opposite sides of the longitudinal split 24 therein. The locking strip 28 also has outer flanges 34 respectively engageable with the outer surface of the housing 20 on opposite sides of the longitudinal split 24 therein, and respectively having longitudinally extending channels 36 receiving the ribs 26. As will be apparent, the locking strip 28 locks the housing 20 against circumferential expansion intermediate the ends thereof and closes the longitudinal split 24 intermediate the ends of the housing.

The locking strip 28, and its relationship with the ribs 26, are disclosed in my copending patent applications Ser. Nos. 580,201, filed May 23, 1975, (now abandoned) and 580,477, also filed May 23, 1975. The first application mentioned discloses a locking strip which is rigid, while the second discloses one which is flexible so that it can be ripped out readily when re-entry into the enclosure 10 is desired. Either may be used for the locking strip 28. As will be apparent, the tubular housing 20 may be closed initially, or re-closed, by sliding the locking strip 28 into position longitudinally of the housing, with the interengageable components of the housing and the locking strip having the positional relationships shown in FIG. 4 of the drawing.

The re-enterable cable splice enclosure 10 also includes two flexible, longitudinally split end caps 40 respectively telescopable over the ends of the tubular housing 20, the length of the locking strip 28 preferably being such that the inner ends of the end caps 40 abut the ends of the locking strip. Preferably, the end caps 40 are made of a suitable plastic material which is relatively soft and pliant.

Each of the end caps 40 includes an outer end 42 provided with a longitudinally extending nipple 44 of a size to receive the main cable 16 and having circumferentially spaced longitudinal slits 46 which extend longitudinally inwardly from the outer end thereof and one of which constitutes an extension of the longitudinal split 48 in the corresponding end cap. With this construction for the nipple 44 on each end cap 40, flaps 50 are provided which snugly engage the main cable 16 and which can be taped to the main cable, as indicated at 52, to provide a weatherproof seal.

Each end cap 40 carries a longitudinally split end cap locking means 54, which may be bonded to the end cap, for releasably locking such end cap against circumferential expansion and for closing the longitudinal split 48 therein from the inner end of such end cap at least substantially to the slit 46 constituting an extension of the split 48. As best shown in FIG. 3, each end cap locking means 54 includes a part 55 provided along one edge of the longitudinal split 48 in the corresponding end cap 40 with a radially outwardly extending, longitudinal flange 56 carrying radially spaced, longitudinally extending hooks 58, the pair of hooks 58 having a configuration, in cross section, somewhat like that of an arrowhead.

Each end cap locking means 54 includes, adjacent the other edge of the split 48 in the corresponding end cap 40, a part 59 terminating in a hook 60 complementary to and interengageable with the radially innermost hook 58. An L-shaped flange 62 is carried by the part 59 of the end cap locking means 54 and includes a circumferential portion 64 terminating in another hook 60 complementary to and interengageable with the radially outermost hook 58, all as will be clear from FIG. 3 of the drawing.

As will be apparent, in order to close the longitudinal split 48 in each cap 40, it is merely necessary to push the longitudinally extending, radially spaced hooks 58 between the longitudinally extending, radially spaced hooks 60, whereupon an interlock resisting circumferential expansion of the corresponding end cap 40 is achieved automatically. Since the material of which the end caps 40 and the end cap locking means 54 are made is flexible and pliant, the hooks 58 may be disengaged from the hooks 60 to open the corresponding end cap merely by pulling the hooks 58 circumferentially outwardly from between the hooks 60. Thus, each end cap locking means 54 may be locked and released as required very readily, which is an important feature of the invention.

The outer end 42 of each end cap 40, in addition to the slitted nipple 44 for the main cable 16, is also provided with a plurality of smaller, longitudinally extending nipples 66 each having a closed outer end 68 adapted to be severed, as at 70 in FIG. 1, to accommodate one of the service cables 14. It will be understood that only as many of the nipples 66 are severed as there are service cables 14.

Considering the manner in which the various parts of the kit forming the enclosure 10 are assembled to encapsulate the splice or splices 12, the necessary nipples 66 are first severed, at 70, and the service cables 14 are then inserted therethrough. The service cables 14 are then spliced to the main cable 16, as indicated diagrammatically at 12.

Then, the split 24 in the tubular housing 20 is spread enough to permit lateral application over the splice 12, the material of the housing 20 being sufficiently flexible for this purpose. Then, the locking strip 28 is longitudinally installed from one end of the tubular housing 20, with the various components of the locking strip 28 and the tubular housing having the relative positions shown in FIG. 4 of the drawing.

Next, one of the end caps 40 is laterally applied to the main cable 16 by spreading the split 48 thereof, and such end cap is then telescoped over the correspondi: ̣ end of the tubular housing 20. Thereupon, the corresponding end cap locking means 54 is locked by inserting the radially spaced hooks 58 between the radially spaced hooks 60. Then, the flaps 50 of the corresponding nipple 44 are taped to the main cable 16, as indicated at 52.

The foregoing completed, by tilting the tubular housing 20 until the open end thereof is uppermost, the tubular housing and the end cap 40 installed thereon can be filled with unset potting compound 18, or, alternatively, sufficient potting compound can be introduced to insure encapsulation of the splice 12.

The foregoing completed, the other end cap 40 is installed in the same way as the first one. If complete filling of the enclosure 10 with potting compound is desired or necessary, additional unset potting compound can be poured into the enclosure between the main cable 16 and the flaps 50 of the nipple 44 before taping the flaps to the main cable.

If it is necessary to add a service cable 14, the end caps 40 and the tubular housing 20 are opened by releasing the end cap locking means 54 and the housing locking means 22, the taped connections to the main cable 16 being removed first. Then, as much of the potting compound 18 is removed as is necessary to attain access for the purpose of splicing in the additional service cable, a closed outer end 68 of an available nipple 66 being severed to accommodate the additional sevice cable, which is installed in the same way as described previously.

After the additional service cable has been spliced to the main cable 16, the enclosure 10 is re-closed, and re-charged with potting compound, following essentially the same procedures as hereinbefore set forth.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. A re-enterable cable splice enclosure kit including:
   a. a longitudinally split tubular housing;
   b. releasable housing locking means for releasably locking said tubular housing against circumferential expansion intermediate the ends thereof and for closing the longitudinal split in said housing intermediate the ends thereof;
   c. flexible, longitudinally split end caps respectively telescopable over the ends of said tubular housing;
   d. two releasable end cap locking means for respectively releasably locking said end caps against circumferential expansion and for closing the longitudinal splits therein;
   e. at least one of said end caps including an outer end provided with a longitudinally extending nipple having circumferentially spaced slits extending longitudinally inwardly from the outer end thereof; and
   f. at least one of said end caps including an outer end provided with at least one longitudinally extending nipple having a closed outer end adapted to be severed to open same.

2. An enclosure kit as defined in claim 1 wherein one of said circumferentially spaced slits constitutes an extension of the split in the corresponding end cap.

3. A re-enterable cable splice enclosure kit including:
   a. a longitudinally split tubular housing;
   b. releasable housing locking means for releasably locking said tubular housing against circumferential expansion intermediate the ends thereof and for closing the longitudinal split in said housing intermediate the ends thereof;
   c. flexible, longitudinally split end caps respectively telescopable over the ends of said tubular housing;
   d. two releasable end cap locking means for respectively releasably locking said end caps against circumferential expansion and for closing the longitudinal splits therein;
   e. each of said end caps including an outer end provided with a longitudinally extending nipple having circumferentially spaced slits which extend longitudinally inwardly from the outer end thereof and one of which constitutes an extension of the split in the corresponding end cap; and
   f. said outer end of each of said end caps being provided with longitudinally extending nipples each having a closed outer end adapted to be severed to open same.

4. An enclosure kit according to claim 3 wherein said longitudinal split in said housing has edges respectively provided with outwardly projecting, longitudinally extending ribs, and wherein said housing locking means comprises a locking strip having a web insertable between said edges of said longitudinal split in said housing, inner flanges respectively engageable with the inner surface of said housing on opposite sides of said longitudinal split therein, and outer flanges respectively engageable with the outer surface of said housing on opposite sides of said longitudinal split therein and respectively having longitudinally extending channels for receiving said ribs.

5. An enclosure kit as set forth in claim 4 wherein each of said releasable end cap locking means includes a first pair of radially spaced, longitudinally extending hooks carried by one edge of the longitudinal split in the corresponding end cap, and a second pair of radially spaced, longitudinally extending hooks carried by the other edge of said split in said corresponding end cap, the hooks of said first pair being complementary to and interengageable with the hooks of said second pair, and the hooks of said first pair being circumferentially insertable between the hooks of said second pair to interengage same.

6. An enclosure kit as set forth in claim 3 wherein each of said releasable end cap locking means includes a first pair of radially spaced, longitudinally extending hooks carried by one edge of the longitudinal split in the corresponding end cap, and a second pair of radially spaced, longitudinally extending hooks carried by the other edge of said split in said corresponding end cap, the hooks of said first pair being complementary to and interengageable with the hooks of said second pair, and the hooks of said first pair being being circumferentially insertable between the hooks of said second pair to interengage same.

7. A re-enterable cable splice enclosure enclosing spliced main and service cables, including:
   a. a longitudinally split tubular housing;
   b. releasable housing locking means releasably locking said tubular housing against circumferential expansion intermediate the ends thereof and closing the longitudinal split in said housing intermediate the ends thereof;
   c. flexible, longitudinally split end caps respectively telescoped over the ends of said tubular housing;
   d. two releasable end cap locking means respectively releasably locking said end caps against circumferential expansion and closing the longitudinal splits therein;

e. each of said end caps including an outer end provided with a longitudinally extending nipple receiving one of the main cables and having circumferentially spaced slits which extend longitudinally inwardly from the outer end thereof and one of which constitutes an extension of the split in the corresponding end cap;

f. said outer end of each of said end caps being provided with longitudinally extending nipples each having a closed outer end at least one of which is severed to open same and through which extends one of the service cables; and g. a potting compound in said housing and said end caps.

* * * * *